A. F. BECK.
CALK WELDING ATTACHMENT FOR ANVILS.
APPLICATION FILED NOV. 26, 1909.
956,927.
Patented May 3, 1910.
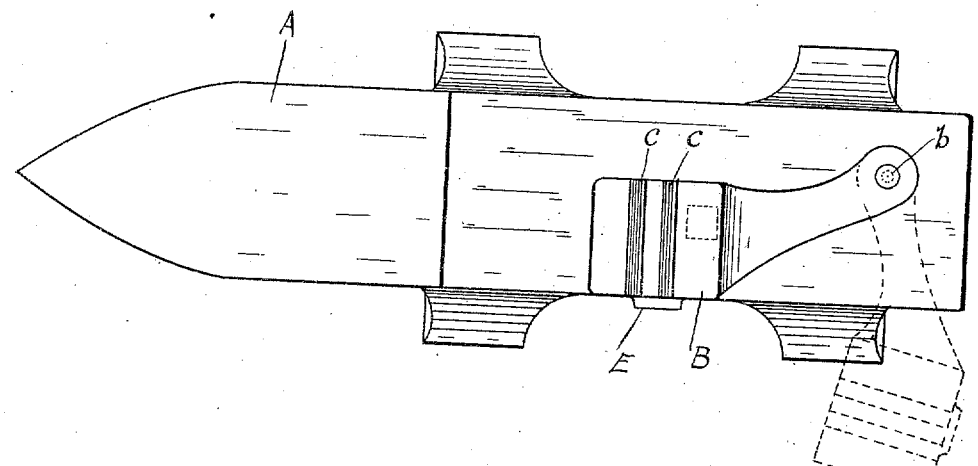
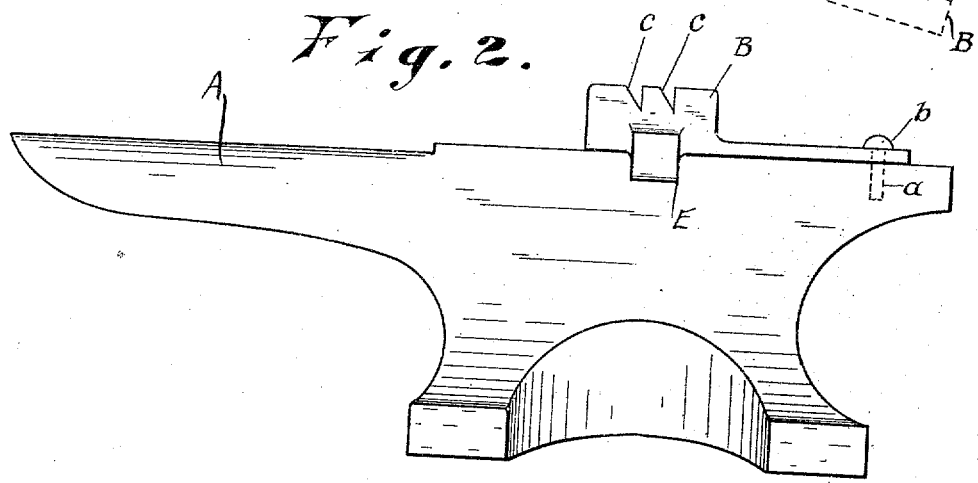

UNITED STATES PATENT OFFICE.

ANDREW F. BECK, OF MILWAUKEE, WISCONSIN.

CALK-WELDING ATTACHMENT FOR ANVILS.

956,927. Specification of Letters Patent. Patented May 3, 1910.

Application filed November 26, 1909. Serial No. 529,874.

*To all whom it may concern:*

Be it known that I, ANDREW F. BECK, a citizen of the United States, residing at Milwaukee, county of Milwaukee, and State of Wisconsin, have invented new and useful Improvements in Calk-Welding Attachments for Anvils, of which the following is a specification.

My invention relates to improvements in welding attachments for anvils, and pertains especially to that class of welding attachments which are used for welding horseshoe calks.

The object of my invention is to provide means whereby the attachment may be conveniently removed from the body of the anvil to a position where it will not be in the way, but without removing it entirely from the anvil. Also to provide means whereby said device may be swung without loss of time into position of use and held in that position while in use.

In the following description, reference is had to the accompanying drawings in which, Figure 1 is a plan view of an anvil, with my invention applied thereto in position of use, with dotted lines indicating a position of non-use. Fig. 2 is a side view of the same.

Like parts are identified by the same reference characters in both views.

A is an anvil of any ordinary type, provided with a circular aperture near its rear or untapered end.

B is a metal plate, provided with calk welding channels C in its upper surface. This plate is provided with a pin or bolt $b$, adapted to fit the circular aperture $a$ in the rear portion of the anvil, whereby the plate B is pivotally connected with the anvil, although it may be readily removed by lifting it vertically. The pin $b$ may be merely socketed in the aperture $a$, or the plate may be connected by a bolt and nut or other pivotal fastening.

The plate B is provided on one side with a downwardly extending lip or projection E, which, when the plate is in position of use, is adapted to impinge against the side of the anvil and serve as a stop, which materially assists in holding the plate in position of use. When it is not desired to use the plate, it may be swung upon this pivot $a$ to the position indicated by the dotted lines in Fig. 1, in which position it will not interfere with any desired work to be performed upon the horseshoe.

In case the anvil is to be used for other purposes than welding horseshoes, the plate B may be lifted and removed bodily from the anvil by withdrawing the pin $b$ from this socket $a$.

Having thus described my invention, what I claim as new, and desire to secure by Letters Patent is,—

1. The combination with an anvil, provided with a cylindrical socket, of a welding plate, resting upon the upper surface of the anvil, and having a pivot pin entered in said socket, said welding plate being provided with welding grooves, and also having a depending lip adapted to engage the side of the anvil when the plate is in position of use.

2. The combination with an anvil, of a detachable welding plate pivotally connected with the upper surface thereof, and adapted to swing in a horizontal plane, said welding plate being provided with calk receiving grooves.

In testimony whereof I affix my signature in the presence of two witnesses.

ANDREW F. BECK.

Witnesses:
LEVERETT C. WHEELER,
ATTILIA C. WEBER.